(12) United States Patent
Fuhs et al.

(10) Patent No.: US 6,260,090 B1
(45) Date of Patent: Jul. 10, 2001

(54) CIRCUIT ARRANGEMENT AND METHOD INCORPORATING DATA BUFFER WITH PRIORITY-BASED DATA STORAGE

(75) Inventors: Ronald Edward Fuhs; Kenneth Claude Hinz; Russell Dean Hoover; David Alan Shedivy, all of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/262,158

(22) Filed: Mar. 3, 1999

(51) Int. Cl.$^7$ ........................................ G06F 13/00
(52) U.S. Cl. ..................... 710/107; 710/40; 710/244; 711/147; 711/154; 709/214
(58) Field of Search ..................... 710/107, 110, 710/111, 129, 52–57, 40, 22, 243–244, 131–132; 711/147, 151, 158; 709/201, 213, 214, 216

(56) References Cited

U.S. PATENT DOCUMENTS

| | | | |
|---|---|---|---|
| 4,115,855 | * | 9/1978 | Chiba .................................... 711/151 |
| 5,222,223 | * | 6/1993 | Webb, Jr. et al. ................... 711/147 |
| 5,533,201 | * | 7/1996 | Benton et al. ....................... 710/100 |
| 5,649,157 | * | 7/1997 | Williams ............................. 711/151 |
| 5,701,507 | * | 12/1997 | Bonneua, Jr. et al. ............. 709/200 |
| 5,768,626 | * | 6/1998 | Munson et al. ....................... 710/57 |
| 5,778,442 | * | 7/1998 | Ezzat et al. ........................ 711/159 |
| 5,809,278 | * | 9/1998 | Watanabe et al. .................. 711/151 |
| 5,832,304 | * | 11/1998 | Bauman et al. ...................... 710/40 |
| 5,859,975 | * | 1/1999 | Brewer et al. ....................... 709/213 |
| 5,867,672 | * | 2/1999 | Wang et al. ......................... 710/127 |
| 5,878,280 | * | 3/1999 | Lucht ................................... 710/52 |
| 5,904,732 | * | 5/1999 | Greenley et al. ..................... 710/57 |
| 5,906,000 | * | 5/1999 | Abe et al. ........................... 711/151 |
| 5,941,962 | * | 8/1999 | Hirano et al. ........................ 710/53 |

OTHER PUBLICATIONS

"What Is . . . NUMA (a definition)", http://whatis.com/numa.htm, 1 page, (Jun. 28, 1998).

Kirkpatrick, Keith, "The Move to NUMA", http://www.zd-net.com/computershopper/edit/cshopper/content/9706/cshp0042.html, *Computer Shopper*, pp. 1–5, (6/97).

\* cited by examiner

Primary Examiner—Robert Beausoleil
Assistant Examiner—Raymond N Phan
(74) Attorney, Agent, or Firm—Wood, Herron & Evans; Scott A. Stinebruner

(57) ABSTRACT

A data processing system, circuit arrangement, integrated circuit device, program product, and method utilize a data buffer with a priority-based data storage capability to handle incoming data from a plurality of available data sources. With such a capability, different relative priority levels are assigned to data associated with different data sources. Such priority levels are then used by control logic coupled to the buffer to control whether or not incoming data is stored (or optionally discarded) in the buffer. In particular, the relative priority of incoming data is compared with that associated with data currently stored in the buffer, with the incoming data being stored in the buffer only when its relative priority exceeds that of the currently-stored data.

27 Claims, 4 Drawing Sheets

CIRCUIT ARRANGEMENT AND METHOD INCORPORATING DATA BUFFER WITH PRIORITY-BASED DATA STORAGE

FIELD OF THE INVENTION

The invention is generally related to data processing systems such as computers and the like, and in particular to the handling of multiple data responses returned to a data buffer of the type utilized in such systems.

BACKGROUND OF THE INVENTION

Data buffers are conventionally used in an innumerable number of applications to store data in a data processing system such as a computer. One specific application of a data buffer, for example, is in temporarily storing data received over a communications bus.

For example, data buffers are conventionally used in the memory controllers that interface one or more microprocessors with various components in a memory system. A memory system typically stores computer instructions from a computer program that are executed by the microprocessor(s), as well as other data that the microprocessor(s) manipulate in response to executed computer instructions. Moreover, a memory system is typically partitioned into a plurality of storage locations identified by unique memory addresses. The memory addresses collectively define a "memory address space," representing the addressable range of memory addresses that can be accessed by the microprocessor(s).

To cost-effectively improve the performance of a memory system, oftentimes memory system utilizes a "multi-level" memory architecture, where smaller, but faster memory devices are combined with larger, but slower memory devices, with data transferred from the slower devices to the fast devices as needed so that future accesses to the data are made using the faster devices. Oftentimes, the faster devices are referred to as cache memories, or caches, which may be dedicated to one microprocessor or shared by multiple microprocessors. When caches are used, groups of memory addresses are typically referred to as "cache lines", and a memory controller is used to swap such groups collectively into and out of a cache to attempt to maximize the frequency that requested memory addresses are stored in the fastest cache memory accessible by a microprocessor needing access to the requested addresses.

One particular multi-level memory architecture suitable for use with multiple microprocessors is a non-uniform memory architecture (NUMA), which organizes multiple microprocessors into "clusters" that includes a few microprocessors (e.g., two or four) that share a "local" set of memory devices. In some designs, for example, each microprocessor has a dedicated, internal level one (L1) cache, as well as a level two (L2) cache that is either dedicated or shared with other microprocessors in the cluster. A main memory and/or level three (L3) cache may serve as the common memory for each cluster. In addition, the clusters are connected to one another over a common bus to permit the microprocessors within a given cluster to access data stored in the local memories of other clusters. Furthermore, additional main memory, shared by all clusters, may also be accessible over the common bus, or via a separate bus to which each cluster is further interfaced.

In many NUMA systems, a single memory controller is used to interface together the various communications buses in a cluster. For example, each cluster may have one or more local (or processor) buses that communicate data between a microprocessor and its L1 and/or L2 caches. Each cluster may also have one or more main memory buses that interface with a main memory and/or an L3 cache for the cluster. Furthermore, each cluster may also have one or more remote buses that interface with the memory devices in the other clusters. The memory controller within a cluster therefore provides an interface between all such buses, and serves to route data requests to appropriate buses, as well as retrieve the data and process the responses returned over such buses. Whenever data is retrieved from a data source, the memory controller typically stores the data within a data buffer that is accessible by a requesting microprocessor.

However, in a NUMA architecture, like many other multi-level memory architectures, data for any given memory address may be stored in any number of data sources at any given time. Moreover, the data stored in different data sources may be modified from time to time, causing other copies of the data stored in other data sources to become "stale", or invalid. As such, an additional function of a memory controller in such an architecture is to determine where the most recently updated copy of requested data can be found in the memory system.

Conventional attempts to locate the most recently updated copy of requested data often rely on one or more directories that keep track of where the most recently updated copies of data are located, a process typically referred to as maintaining "coherency" among the various data sources. Particularly in NUMA and other distributed architectures, the directories are typically distributed throughout a system, with each directory only containing coherency information for data stored local to that directory (e.g., within each cluster). With distributed directories, therefore, maintaining coherence typically requires remote directories to be accessed to determine where the most recently updated copy of requested data can be found.

Coherency is typically implemented by passing a data request to one or more data sources requesting data from a particular memory location. Each data source then returns a response indicating whether or not that data source has a copy of the requested data, and the responses are combined for use in updating the various directories distributed throughout a system. To speed access, often a data source that does have a valid copy of requested data also forwards the requested data to the requester concurrently with its response.

In some conventional systems, different levels of a memory architecture are polled separately to locate data. For example, a request from a microprocessor in one cluster of a NUMA system may be first passed to the processor bus to poll the processor's L1 and/or L2 caches, then subsequently passed to the L3 bus to poll the associated L3 cache only if it is determined that the requested data is not found in the L1 and L2 caches. Moreover, a request may not be passed to the memory bus to poll other clusters and/or main memory unless and until it is determined that the requested data is not found in the local L3 cache for the cluster.

A benefit of serially issuing requests in this manner is that the amount of requests to lower levels of memory (i.e., the local L3 cache and the remote clusters in the above example) is reduced, thus occupying less available bandwidth on the buses connected thereto. Further, with this arrangement a memory controller typically requires only a single data buffer to service any given request. On the other hand, by serially issuing requests, the latency associated with retrieving data stored in a lower level of memory is increased since the request therefor is not issued until after higher levels of memory have already been checked.

In other conventional systems, the latency for lower level memories is reduced by issuing, or "broadcasting", a request on multiple buses at the same time. However, with such an arrangement, it often cannot be known in what order the responses will be returned. Furthermore, additional delay is required to combine responses to determine what data source has the most recent data. Moreover, in many conventional designs, a memory controller is implemented using separate integrated circuit devices, or chips, to handle dataflow and control logic. In such multi-chip designs, additional delay is often required for the control chip to decode the responses and inform the data chip as to which copy of the requested data to store in the data buffer.

Given that the requested data is often returned with the response of a data source that has a copy of the data, multiple data buffers may need to be used to store the incoming data from the buses so that all incoming data can be temporarily stored until the responses can be decoded. In the alternative, several levels of data staging latches may need to be interposed between each bus and the buffer to allow time to decode the responses and determine upon which bus the most recent copy of the data is found. Using multiple buffers, however, occupies more space and increases the complexity of a memory controller design. On the other hand, the addition of data staging latches increases latency and reduces performance.

Due to the inability to determine (1) the order in which responses may be received, and (2) which response will include a most recently updated copy of requested data, conventional memory controller designs typically are subject to a tradeoff between, on the one hand, performance, and on the other hand, complexity. Consequently, a significant need continues to exist for an improved manner of retrieving data from multiple available data sources that offers better performance without significantly increasing complexity.

SUMMARY OF THE INVENTION

The invention addresses these and other problems associated with the prior art by providing a data processing system, circuit arrangement, integrated circuit device, program product, and method that utilize a data buffer with a priority-based data storage capability to handle incoming data from a plurality of available data sources. With such a capability, different relative priority levels are assigned to data associated with different data sources. Such priority levels are then used by control logic coupled to the buffer to control whether or not incoming data is stored (or optionally discarded) in the buffer. In particular, the relative priority of incoming data is compared with that associated with data currently stored in the buffer, with the incoming data being stored in the buffer only when its relative priority exceeds that of the currently-stored data.

While other criteria may be used to distinguish multiple priority levels consistent with the invention, one particularly useful implementation assigns priorities based upon when data was last updated, with data updated relatively more recently being assigned a higher priority. Among other possible applications, such a priority scheme permits, for example, a memory controller to utilize a single data buffer to receive data returned from multiple data sources in response to a broadcasted memory request, particularly in implementations where requested data is returned concurrently with responses to a request. As a result, the invention has applicability in a wide variety of environments where data from multiple data sources is capable of being returned in response to a memory request, e.g., in distributed and/or multi-level shared memory architectures, or in any other memory architecture utilizing multiple coherency points.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
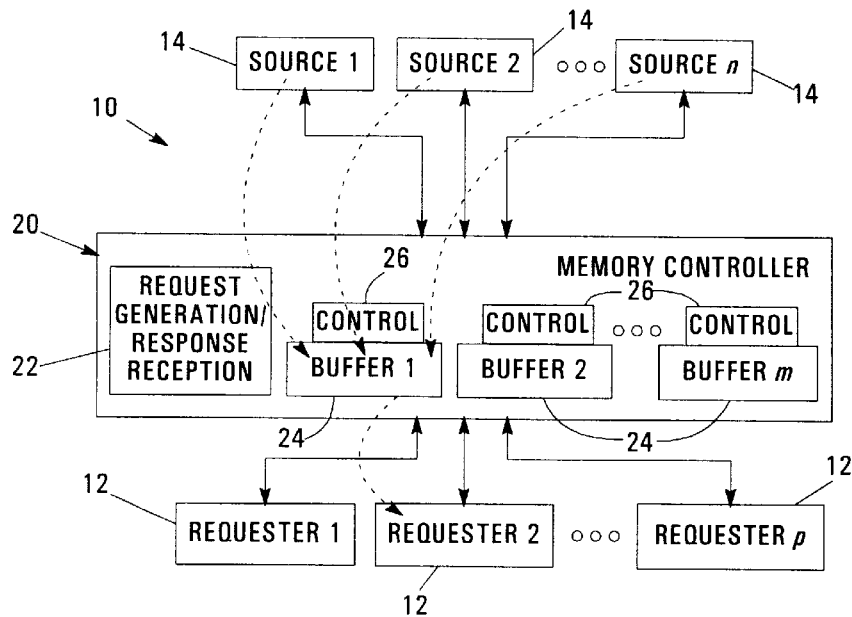
FIG. 1 is a block diagram of an exemplary data processing system consistent with the invention.

The illustrated implementations of the invention are typically used to enhance and simplify the interface between multiple data sources and one or more memory requesters in a data processing system that implements a shared memory system, particularly one in which memory requests are broadcast to multiple data sources over multiple data paths, e.g., multiple buses. For example, FIG. 1 illustrates an exemplary data processing system 10 in which one or more requesters 12 (requesters 1 . . . p) are interfaced with a plurality of data sources 14 (data sources 1 . . . n) via a memory controller illustrated at 20.

A memory requester as used herein may be considered to be a processor or processing unit, or any other logic circuitry that utilizes data stored in a shared memory system. A data source, in turn, may include practically any data storage device or subsystem in a shared memory system from which data may be retrieved, including main storage and various levels of cache memories, irrespective of the level of such cache memories, whether such cache memories are internal or external relative to a processor or other requester, whether such cache memories are data-only memories or collective data/instruction memories, whether such cache memories are dedicated to a particular requester or shared among several requesters, etc. A data source can also include other shared or dedicated memories, including virtual memory, e.g., as implemented with one or more direct access storage devices in a page-based memory system. A data source may also include memories distributed in a cache-only memory architecture (COMA) or a non-uniform memory architecture (NUMA) system. Furthermore, a data source can also include other buffers or registers that may serve as a source for data, including translation lookaside buffers, processor registers, processor buffers, etc. Further, a data source may include any combination of the above components from which a common response to a memory request can be generated.

Memory is retrieved in data processing system 10 in response to a request for data issued to memory controller 20 from one of requesters 12, in a manner generally understood in the art. In response to such a request, memory controller 20 generates and broadcasts memory requests to the various data sources 14, and receives responses therefrom, the handling of which is represented by request generation/response reception logic block 22.

For a given request from a memory requester, one of a plurality of data buffers 24 (e.g., data buffers 1 . . . m) is assigned to receive the data from the data source storing the most recently updated copy of the data. For example, as shown in FIG. 1, a data buffer 1 is illustrated as assigned to receive responses from the plurality of data sources 1 . . . n in response to a memory request issued by requester 2. In the alternative, in implementations in which concurrent processing of multiple memory requests is not supported, only one data buffer may be required.

Each data buffer 24 has associated therewith control logic 26 that controls the storage of data into its associated data buffer to implement priority-based data storage capability consistent with the invention. Specifically, data associated with different data sources is assigned different relative priorities that are used to determine whether or not incoming data to the memory controller should be written into a data buffer. The control logic 26 associated with a particular data buffer 24 is used to compare a priority associated with incoming data with that associated with data currently stored in the buffer to determine whether or not the currently-stored data should be overwritten with the incoming data.

Figure 2:
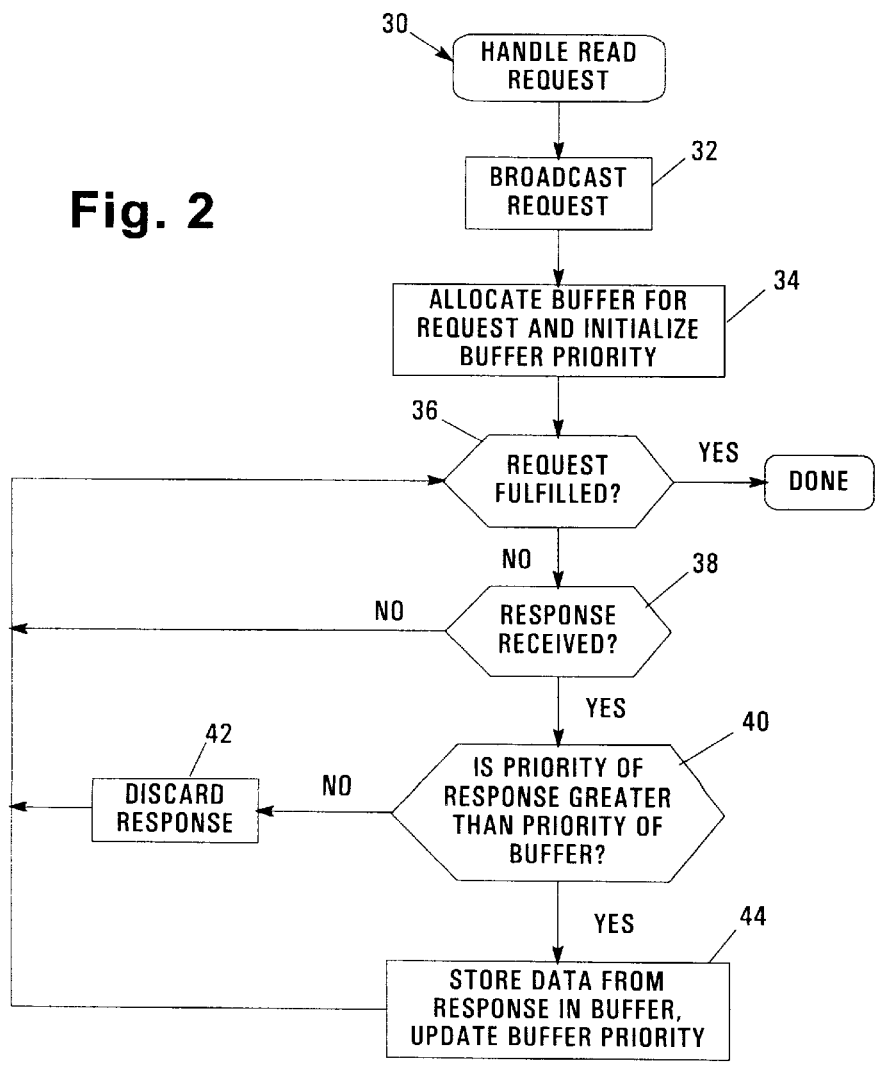
FIG. 2 is a flowchart illustrating a sequence of operations performed during a read request operation in the data processing system of FIG. 1.

One suitable manner of handling read requests issued by memory requesters using memory controller 20 is illustrated at 30 in FIG. 2. To handle such a request, memory controller 20 first broadcasts the request to each data source in block 32, in a manner known in the art. Next, in block 34 one of buffers 24 is allocated for the request and initialized with an initial priority (e.g., the lowest level priority). Next, it is determined in block 36 whether the request has been fulfilled, that is, whether the requested data has been returned. Such a determination may be based upon, for example, whether all data sources have responded to the request. In other implementations, it may be known from a subset of the responses that remaining responses will not contain the requested data (e.g., if one response indicates that the highest priority data is being returned). Thus, in such implementations, other criteria may be used to determine whether a request has been fulfilled.

Assuming first that the request has not been fulfilled, control passes to block 38 to determine whether a response has been received. If not, control returns to block 36. If, however, a response has been received, control passes to block 40 to determine whether the priority associated with the response is greater than that of the data currently stored in the buffer. If not, the response and its associated data can be discarded, as shown at block 42. If so, however, the data associated with the response can be stored in the buffer at block 44, with the priority of the buffer also updated to reflect the update to the buffer data. Blocks 42 and 44 then return control to block 36. Processing then repeats as described above until it is determined that the request has been fulfilled. Once this occurs, handling of the read request is then complete. Furthermore, upon completion, the buffer will contain a copy of the highest priority data received in response to the request.

A number of different criteria may be used to define multiple priority levels for data associated with different data sources. In the implementation discussed hereinafter, priority is based upon currency of update, whereby data that has been updated more recently is assigned a higher priority. However, other methods of defining priority, including via locality and/or ownership (among others), may be used in the alternative.

Moreover, in the implementation discussed hereinafter, data priority is statically defined for each data sources, such that data retrieved from a particular data source always has the same relative priority. Moreover, such an arrangement permits priority information to be defined simply by which data path the requested data is being returned on. However, in other implementations, it may be desirable to define priority levels dynamically, such that different data sources may have different priority levels in different circumstances. Further, in other implementations, it may be desirable to transmit priority information along with a response for use in determining whether to store or discard data returned thereby, e.g., via additional lines, or via encoding, etc.

Other modifications will be apparent to one of ordinary skill in the art having benefit of the instant disclosure.

Figure 3:
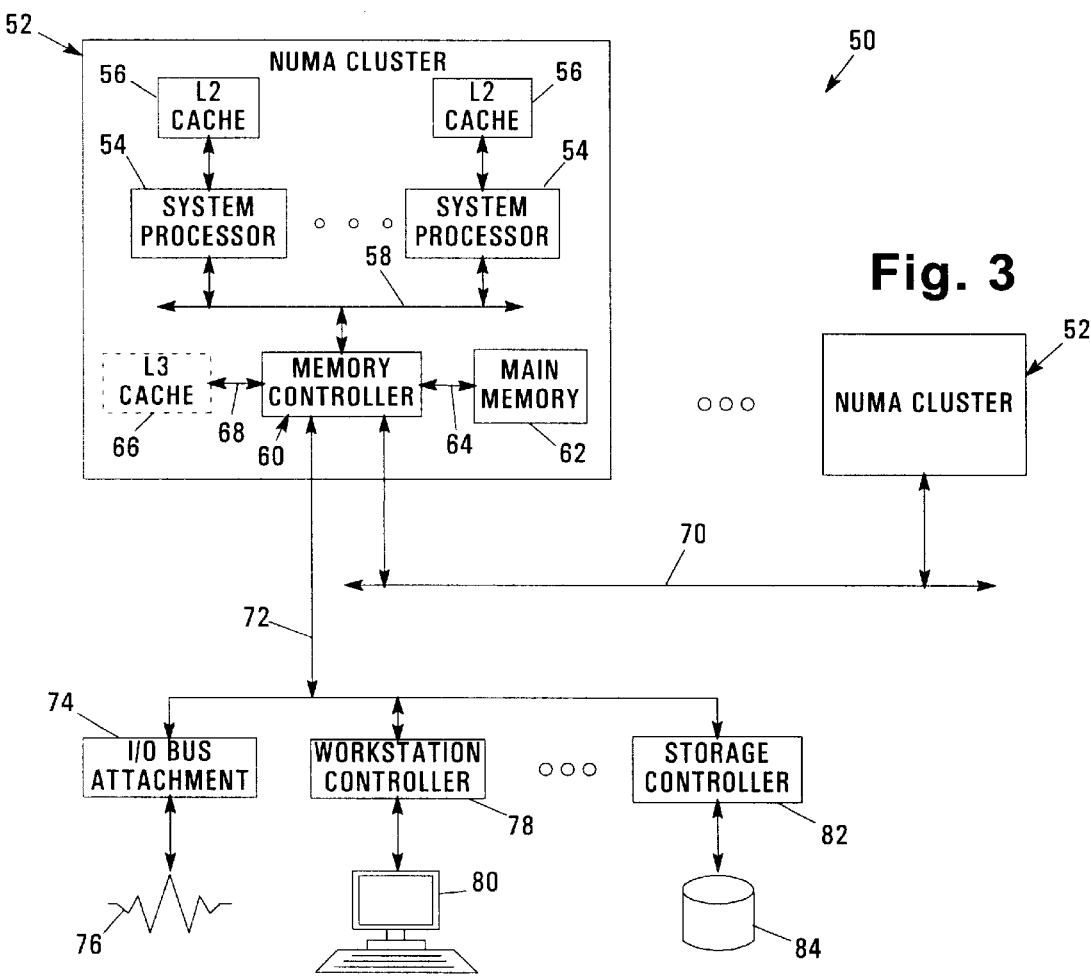
FIG. 3 is a block diagram of another exemplary data processing system consistent with the invention.

Turning now to FIG. 3, one specific implementation of the invention, utilizing a NUMA-based shared memory system, is represented by data processing system 50. System 50 generically represents, for example, any of a number of multi-user computer systems such as a network server, a midrange computer, a mainframe computer, etc. However, it should be appreciated that the invention may be implemented in other data processing systems, e.g., in stand-alone or single-user computer systems such as workstations, desktop computers, portable computers, and the like, or in other computing devices such as embedded controllers and the like.

Data processing system 50 generally includes a plurality of interfaced NUMA clusters 52 coupled to one another via a remote bus 70. Each cluster includes one or more system processors 54, each having one or more levels of dedicated cache memory (e.g., an integrated L1 cache (not shown separately) and an external L2 cache 56). System processors 54 are interfaced with one another over a local (or processor) bus 58.

A memory controller 60 is used to permit each processor 54 to access data stored in other memory components in the system. In particular, each cluster includes a block of main memory 62 interfaced with memory controller 60 over a main memory bus 64. Memory controller 60 also is coupled to remote bus 70 to permit a processor to retrieve data stored on a remote cluster, as well as to an input/output (I/O) bus 72 that provides access to various I/O devices, e.g., an input/output bus attachment interface 74, a workstation controller 78 and a storage controller 82, which respectively provide external access to one or more external networks 76, one or more workstations 80, and/or one or more direct access storage devices (DASD's) 84.

Optionally, an L3 cache 66 may also be provided in each cluster, interfaced to memory controller 60 through an L3 bus 68, or alternatively through main memory bus 64. Other combinations of processors, cache memories and the like may be utilized consistent with the invention. Moreover, it should be appreciated that data processing system 50 is merely representative of one suitable environment for use with the invention, and that the invention may be utilized in a multitude of other environments in the alternative, e.g., other shared memory architectures, or any other environments where multiple data sources can return data in response to a memory request. The invention should thus not be limited to the particular implementations discussed herein.

Priority-based data storage consistent with the invention is typically implemented in a memory controller circuit arrangement disposed on one or more programmable integrated circuit devices, and it should be appreciated that a wide variety of programmable devices may utilize priority-based data storage consistent with the invention. Moreover, as is well known in the art, integrated circuit devices are typically designed and fabricated using one or more computer data files, referred to herein as hardware definition programs, that define the layout of the circuit arrangements on the devices. The programs are typically generated by a design tool and are subsequently used during manufacturing to create the layout masks that define the circuit arrangements applied to a semiconductor wafer. Typically, the programs are provided in a predefined format using a hardware definition language (HDL) such as VHDL, verilog, EDIF, etc. While the invention has and hereinafter will be described in the context of circuit arrangements implemented in fully functioning integrated circuit devices and data processing systems utilizing such devices, those skilled in the art will appreciate that circuit arrangements consistent with the invention are capable of being distributed as program products in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, and DVD's, among others and transmission type media such as digital and analog communications links.

Figure 4:
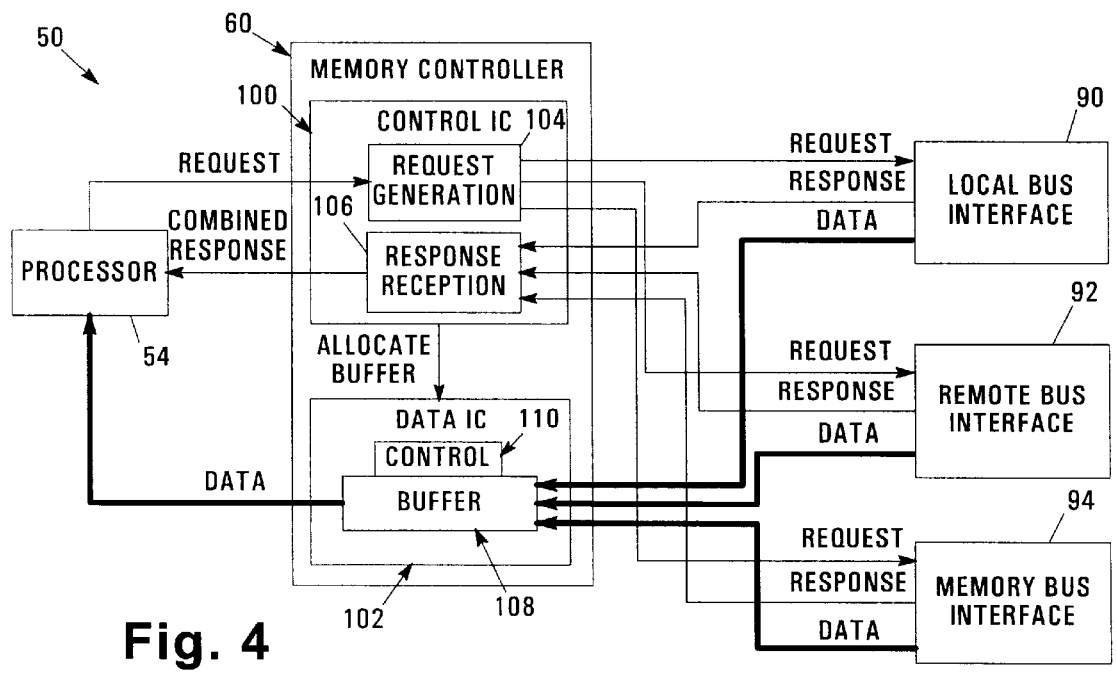
FIG. 4 is a block diagram illustrating an interface between a memory controller, a processor and a plurality of data sources in the data processing system of FIG. 3.

Turning now to FIG. 4, memory controller 60 is shown in greater detail. Memory controller 60 implements a snoopy coherency protocol where a memory request received from a processor 54 is broadcast to a plurality of data sources (either all or a subset of the data sources interfaced with the memory controller), responses are generated by each data source, and the responses are combined into a combined response. The responses are used to maintain coherency in the memory system, and to indicate from where in the memory system the requested data can be found. In addition, typically the requested data is provided along with the response of any data source having a copy of the requested data.

For data processing system, each memory controller 60 is logically interposed between one or more processors 54 (only one shown in FIG. 4) and multiple data sources, here represented by local bus interface 90 (interfaced with local bus 58), remote bus interface 92 (interfaced with remote bus 70) and memory bus interface 94 (interfaced with memory bus 64).

Further, while a memory controller consistent with the invention could be implemented in a single integrated circuit device, memory controller 60 in the illustrated embodiment is implemented in separate control and data integrated circuit devices 100, 102. With such a partition, control device 100 receives a memory request from a processor and generates requests to each bus interface 90–94, using request generation logic represented at 104. At that time, control device 100 also instructs data device 102 to allocate at least one of a plurality of buffers 108 (only one shown in FIG. 4) to store the returning data in. Responses are received from each bus interface 90–94 by control device 100 and used to generate a combined response back to the requesting processor, using response reception logic 106. Also, for response that indicates that a copy of the requested data is found in the data source, the data is forwarded directly to buffer 108 in data device 102.

As discussed above, a difficulty arises due to the partition between control and data devices 100, 102 in that it is not known at the time in which a request is broadcast which buses will be returning data, and thus where the most recent copy of the data will be coming from. Also, the order of the returning data is not known. Since the data is returned at the same time as the response, the control device is not capable of processing a response and informing the data device as to whether or not to store the incoming data in the buffer prior to the data being received by the data device.

To address this difficulty, control logic 110 is associated with each buffer to control data storage into the buffer according to a priority-based protocol. Specifically, each data source is assigned a fixed priority based upon what data source contains the most recently updated copy of the data. In this implementation, the local bus is assigned the highest priority, followed by the remote bus, and finally the memory bus. Such a priority scheme incorporates the inherent structure of a distributed cache system, given that any cached data is more recently used than that stored in main memory.

It should be appreciated that the generation of memory requests and the collection of responses in a memory controller is known in the art, and further discussion thereof is not necessary for a complete understanding of the invention.

Figure 5:
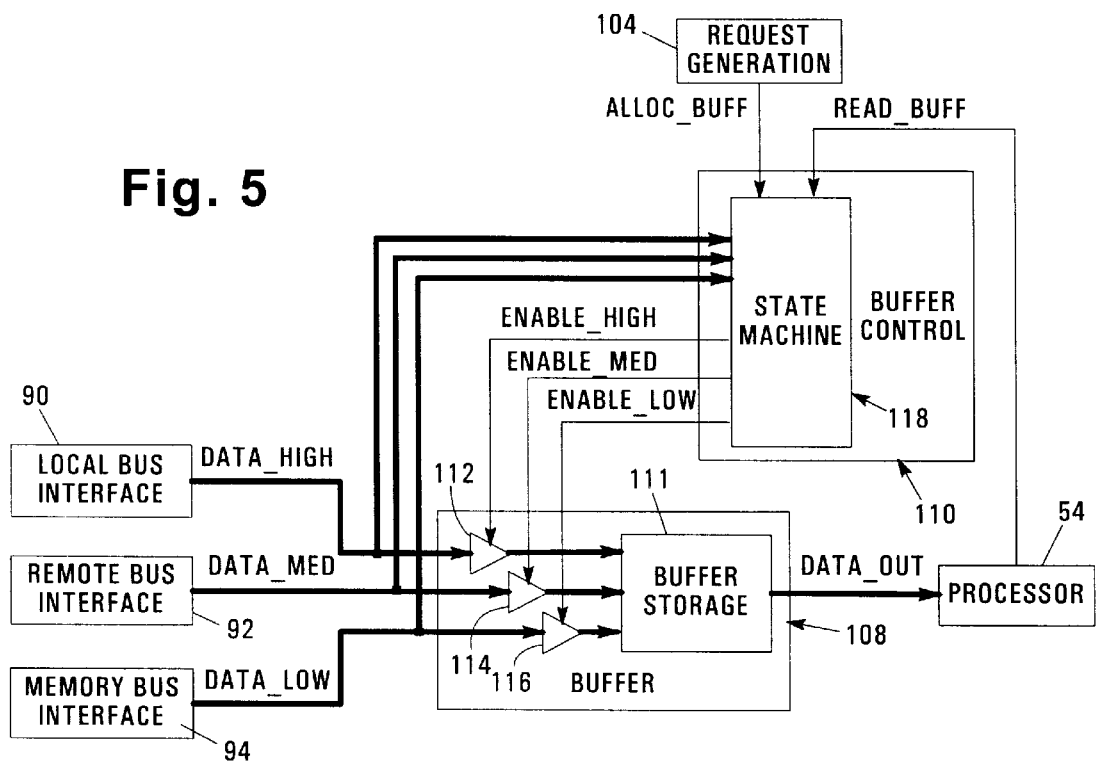
FIG. 5 is a block diagram of a buffer and control logic therefor in the memory controller of FIG. 4.

As shown in FIG. 5, to implement the priority-based protocol, a memory storage device 111 representing the storage for the buffer is interfaced with the available data sources 90–94 through separate gates 112, 114 and 116 controlled by a state machine 118 in buffer control logic 110. Data from local bus interface 90 is provided on a DATA_HIGH line to gate 112, which is selectively controlled by an ENABLE_HIGH write enable signal from state machine 118 to selectively permit or restrict writing of data from local bus interface 90 into buffer storage 111. Likewise, data from remote bus interface 92 is provided on a DATA_MED line to gate 114, which is selectively controlled by an ENABLE_MED write enable signal from state machine 118, and data from memory bus interface 94 is provided on a DATA_LOW line to gate 116, which is selectively controlled by an ENABLE_LOW write enable signal from state machine 118. The output of buffer storage 111 is provided to processor 54 as a DATA_OUT signal.

State machine 118 selectively asserts the ENABLE_HIGH, ENABLE_MED and ENABLE_LOW signals to control gates 112–116 to selectively permit data from data sources 90–94 to be written into buffer storage 111. To do so, state machine 118 receives the DATA_HIGH, DATA_MED and DATA_LOW signals from data sources 90–94 (or any other indicator that simply indicates to the state machine that incoming data has arrived from a particular source). In addition, the state machine also receives an ALLOC_BUFF signal from request generation block 104 in control device 100 whenever a request is issued, and a READ_BUFF signal from processor 54 (or alternatively via control device 100) whenever it is desired to forward the data stored in the buffer to the requesting processor.

Figures 6, 7:
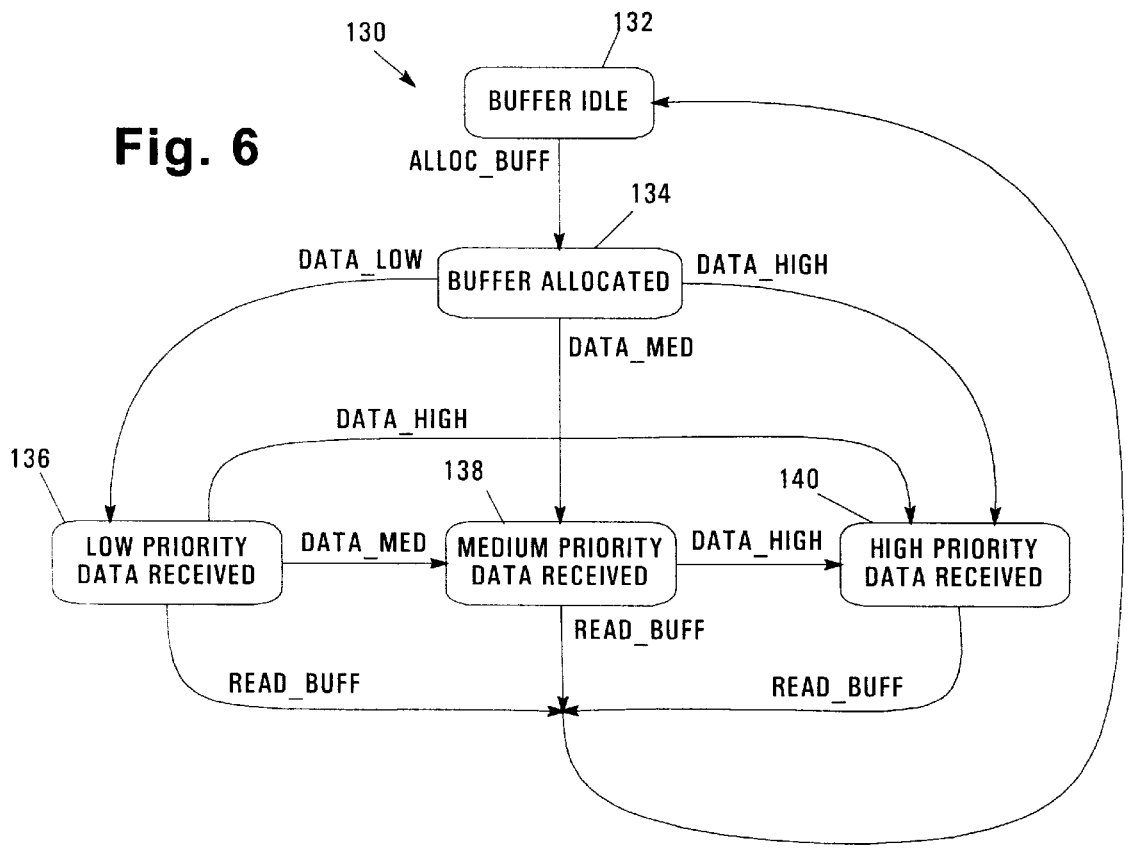
FIG. 6 is a state diagram illustrating the operation of the buffer control logic of FIG. 5.
FIG. 7 is a state table utilized to assert a plurality of buffer enable signals during the operation of the buffer control logic of FIG. 5.

FIG. 6 illustrates a state diagram 130 suitable for use in state machine 118 to implement priority-based data storage in data processing system 50. FIG. 7 also illustrates a state table 150 showing the state of each of the ENABLE_LOW, ENABLE_MED and ENABLE_HIGH signals at the various states in state diagram 130. It should be appreciated that whenever an enable signal is asserted (represented by a logical "1"), the corresponding gate is enabled, and the incoming data from the data source connected to the gate is stored in the buffer. Whenever an enable signal is not asserted, however, the corresponding gate is disabled, and the incoming data is not written into the buffer, but rather is discarded.

As shown in FIG. 6, state machine 118 begins in a BUFFER IDLE state 132, where all gates 112–116 are disabled, until such time as the buffer is allocated by virtue of assertion of the ALLOC_BUFF signal by request generation block 104 (FIG. 5). When this occurs, a state transition occurs to a BUFFER ALLOCATED state 134, and all gates 112–116 are enabled such that any incoming data will be stored in the buffer when it is received. Then, when incoming data is received from a data source, a state transition occurs to one of three states 136, 138 and 140 depending upon the priority of the data source.

If the incoming data is received from memory bus interface 94, a state transition occurs to LOW PRIORITY DATA RECEIVED state 136, where the ENABLE_LOW signal is deasserted. If the incoming data is received from remote bus interface 92, a state transition occurs to MEDIUM PRIORITY DATA RECEIVED state 138, where both the ENABLE_LOW and ENABLE_MED signals are deasserted. If the incoming data is received from local bus interface 90, a state transition occurs to HIGH PRIORITY DATA RECEIVED state 140, where the ENABLE_LOW, ENABLE_MED and ENABLE_HIGH signals are all deasserted.

Returning to state 136, after low priority data has been received, a state transition to state 138 can occur upon receipt of data from remote bus interface 92. Likewise, a state transition to state 140 can occur upon receipt of data from local bus interface 90. Furthermore, from state 138 a state transition to state 140 can occur upon receipt of data from local bus interface 90 after medium priority data has been received. From any of states 136, 138 and 140, assertion of the READ_BUFF signal by a processor when reading the contents of the buffer results in a state transition back to BUFFER IDLE state 132.

With the configuration of state machine 118 as described above, it can be seen that incoming data will be written into buffer 108 only when the priority of the incoming data exceeds that of the data currently stored in the buffer. Incoming data having a lower priority is not written into the buffer, but is instead discarded.

As an example, assume that a request is issued in which all three data sources respond with data, with remote bus interface 92 responding first, followed by local bus interface 90 and then memory bus interface 94. Upon allocation of the buffer, a state transition occurs from state 132 to state 134, and all three gates 112–116 are enabled. Then, upon receipt of the data from remote bus interface 92, the data is written into the buffer (since gate 114 is enabled), and a state transition from state 134 to state 138 occurs, disabling both gates 114 and 116. Upon receipt of data from local bus interface 90, the higher priority data is written into the buffer (since gate 112 is still enabled), and a state transition from state 138 to state 140 occurs, disabling all gates 112–116. Next, upon receipt of data from memory bus interface 94, the lower priority data is discarded (since gate 116 is disabled), and no state transition occurs. As a result, the buffer contains a copy of the highest priority data.

It should be appreciated that configuration of a state machine to implement the state diagram and state table of FIGS. 6 and 7 would be within the ability of one of ordinary skill in the art having benefit of the instant disclosure.

It will be appreciated that priority-based data storage consistent with the invention has a number of advantages over conventional designs. For example, speculative, or pipelined, memory request processing may be supported without the need for multiple buffers to store data from multiple responses and/or data staging latches to stage the data until responses can be decoded.

Various additional modifications will be apparent to one of ordinary skill in the art. For example, if an L3 cache is provided in each cluster, the bus therefor may be treated as a fourth data source for the memory controller. Also, it may be determinable that two data sources (e.g., a cluster's L3 and main memories) are mutually exclusive, whereby the receipt of data from one data source indicates to the controller that no data will be received from the other data source. In such an instance, separate priorities would not need to be allocated for both data sources. Other manners of handling any predetermined relationships between data sources may also be used in connection with priority-based data storage consistent with the invention.

Other modifications may be made consistent with the invention. Therefore, the invention lies in the claims hereinafter appended.

What is claimed is:

1. A circuit arrangement, comprising:
   (a) request generation logic configured to broadcast a request received from a memory requester to a plurality of data sources;
   (b) a buffer configured to be coupled to the plurality of data sources to receive data from more than one data source from the plurality of data sources in response to the request; and
   (c) control logic, coupled to the buffer, the control logic configured to selectively enable storage of data received from a first data source in the plurality of data sources in the buffer only if a first priority associated with the data from the first data source is higher than a second priority associated with data currently stored in the buffer.

2. The circuit arrangement of claim 1, wherein the control logic is further configured to selectively discard the data from the first data source if the first priority is not higher than the second priority.

3. The circuit arrangement of claim 1, wherein the control logic is further configured to determine that the first priority is higher than the second priority if the data received from the first data source has been updated more recently than the data currently stored in the buffer.

4. The circuit arrangement of claim 1, further comprising a plurality of bus interfaces coupled to the buffer, each bus interface configured to couple the buffer to at least one of the plurality of data sources.

5. The circuit arrangement of claim 1, wherein data from each data source has a fixed priority.

6. The circuit arrangement of claim 1, wherein the buffer includes a memory storage device and a plurality of gates, each gate having a data input configured to be coupled to a data source, an output coupled to the memory storage device, and a write enable input coupled to the control logic to selectively permit data received at the data input to be written into the memory storage device.

7. The circuit arrangement of claim 1, wherein the control logic includes a state machine.

8. The circuit arrangement of claim 1, further comprising response reception logic configured to collect responses from the plurality of data sources.

9. The circuit arrangement of claim 8, wherein the request generation logic and response reception logic are disposed in a first integrated circuit device, and wherein the control logic and buffer and disposed in a second integrated circuit device.

10. The circuit arrangement of claim 1, wherein the plurality of data sources further includes second and third data sources, wherein the first data source comprises a local bus, wherein the second data source comprises a remote bus, and wherein the third data source comprises a memory bus, wherein the first data source has a higher priority than the second data source, and the second data source has a higher priority than the third data source.

11. An integrated circuit device comprising the circuit arrangement of claim 1.

12. A data processing system comprising the circuit arrangement of claim 1.

13. A program product, comprising a hardware definition program that defines the circuit arrangement of claim 1; and a signal bearing media bearing the hardware definition program.

14. The program product of claim 13, wherein the signal bearing media includes at least one of a transmission type media and a recordable media.

15. A memory controller, comprising:
   (a) request generation logic configured to broadcast a request received from a memory requester to a plurality of data sources;
   (b) response reception logic configured to collect responses to the request from the plurality of data sources;
   (c) a buffer configured to receive data from more than one data source from the plurality of data sources in response to the request; and
   (d) control logic, coupled to the buffer, the control logic configured to selectively enable storage of data received from a first data source in the plurality of data sources in the buffer only if a first priority associated with the data from the first data source is higher than a second priority associated with data currently stored in the buffer.

16. A data processing system comprising a plurality of clusters coupled to one another over a remote bus, wherein each cluster comprises:
   (a) a plurality of processors coupled to a local bus;
   (b) a memory coupled to a memory bus; and
   (c) a memory controller coupled to the local, remote, and memory buses, the memory controller including:
      (1) request generation logic configured to broadcast a request received from one of the plurality of processors to the local, remote and memory buses;
      (2) response reception logic configured to collect responses to the request from the local, remote and memory buses;
      (3) a buffer configured to receive data from the local, remote and memory buses in response to the request; and
      (4) control logic, coupled to the buffer, the control logic configured to selectively enable storage of data received from the memory bus in the buffer in response to the request only if data has not been received from the local or remote buses, and to selectively enable storage of data received from the remote bus in the buffer in response to the request only if data has not been received from the local bus.

17. A method of controlling a data buffer coupled to a plurality of data sources, the method comprising:
   (a) broadcasting a request received from a memory requester to a plurality of data sources;
   (b) receiving data from more than one of the plurality of data sources in response to the request, including receiving data from a first data source in the plurality of data sources, the data from the first data source having associated therewith a first priority; and
   (c) selectively storing the data received from the first data source in the buffer only if the first priority is higher than a second priority associated with data currently stored in the buffer.

18. The method of claim 17, further comprising selectively discarding the data from the first data source if the first priority is not higher than the second priority.

19. The method of claim 17, further comprising determining that the first priority is higher than the second priority if the data received from the first data source has been updated more recently than the data currently stored in the buffer.

20. The method of claim 17, wherein selectively storing the data received from the first data source in the buffer only if the first priority is higher than the second priority includes selectively enabling a gate disposed between the first data source and a memory storage device in the buffer.

21. The method of claim 17, further comprising collecting responses to the request from the plurality of data sources.

22. The method of claim 17, wherein the plurality of data sources further includes second and third data sources, wherein the first data source comprises a local bus, wherein the second data source comprises a remote bus, and wherein the third data source comprises a memory bus, wherein the first data source has a higher priority than the second data source, and the second data source has a higher priority than the third data source.

23. A circuit arrangement, comprising:
   (a) request generation logic configured to broadcast a request received from a memory requester to a plurality of data sources;
   (b) response reception logic configured to collect responses from the plurality of data sources;
   (c) a buffer configured to be coupled to the plurality of data sources; and
   (d) control logic, coupled to the buffer, the control logic configured to selectively enable storage of data received from a first data source in the plurality of data sources in the buffer only if a first priority associated with the data from the first data source is higher than a second priority associated with data currently stored in the buffer;
wherein the request generation logic and response reception logic are disposed in a first integrated circuit device, and wherein the control logic and buffer and disposed in a second integrated circuit device.

24. A circuit arrangement, comprising:
   (a) a buffer configured to be coupled to a plurality of data sources; and
   (b) control logic, coupled to the buffer, the control logic configured to selectively enable storage of data received from a first data source in the plurality of data sources in the buffer only if a first priority associated with the data from the first data source is higher than a second priority associated with data currently stored in the buffer;
wherein the plurality of data sources further includes second and third data sources, wherein the first data source comprises a local bus, wherein the second data source comprises a remote bus, and wherein the third data source comprises a memory bus, wherein the first data source has a higher priority than the second data source, and the second data source has a higher priority than the third data source.

25. A method of controlling a data buffer, the method comprising:
    (a) receiving data from a one of a plurality of data sources, the data having associated therewith a first priority; and
    (b) selectively storing the received data in the buffer only if the first priority is higher than a second priority associated with data currently stored in the buffer;
wherein the plurality of data sources further includes second and third data sources, wherein the first data source comprises a local bus, wherein the second data source comprises a remote bus, and wherein the third data source comprises a memory bus, wherein the first data source has a higher priority than the second data source, and the second data source has a higher priority than the third data source.

26. A method of controlling a data buffer, the method comprising:
    (a) broadcasting a request received from a memory requester to a plurality of data sources;
    (b) collecting responses from the plurality of data sources;
    (c) receiving data from a one of the plurality of data sources, the data having associated therewith a first priority; and
    (c) selectively storing the received data in the buffer only if the first priority is higher than a second priority associated with data currently stored in the buffer;
wherein broadcasting the request and collecting responses are performed by a first integrated circuit device, wherein the data buffer is disposed in a second integrated circuit device, and wherein receiving the data and selectively storing the received data in the buffer are performed by the second integrated circuit device.

27. A circuit arrangement, comprising:
    (a) a buffer configured to be coupled to a plurality of data sources; and
    (b) control logic, coupled to the buffer, the control logic configured to selectively enable storage of data received from a first data source in the plurality of data sources in the buffer only if a first priority associated with the data from the first data source is higher than a second priority associated with data currently stored in the buffer;
wherein the buffer includes a memory storage device and a plurality of gates, each gate having a data input configured to be coupled to a data source, an output coupled to the memory storage device, and a write enable input coupled to the control logic to selectively permit data received at the data input to be written into the memory storage device.

* * * * *